(12) United States Patent
Wang et al.

(10) Patent No.: US 10,642,494 B2
(45) Date of Patent: May 5, 2020

(54) METHOD, ELECTRONIC DEVICE AND COMPUTER PROGRAM PRODUCT FOR DATA PROCESSING

(71) Applicant: Lenovo (Beijing) Limited, Beijing (CN)

(72) Inventors: Haiyang Wang, Beijing (CN); Xingzhong Mao, Beijing (CN); Bibo Yang, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 468 days.

(21) Appl. No.: 15/395,228

(22) Filed: Dec. 30, 2016

(65) Prior Publication Data

US 2017/0192690 A1 Jul. 6, 2017
US 2019/0339875 A9 Nov. 7, 2019

(30) Foreign Application Priority Data

Dec. 31, 2015 (CN) .......................... 2015 1 1023587

(51) Int. Cl.
  *G06F 3/06* (2006.01)
(52) U.S. Cl.
  CPC .......... *G06F 3/0608* (2013.01); *G06F 3/0659* (2013.01); *G06F 3/0688* (2013.01)
(58) Field of Classification Search
  CPC ....................... G06F 3/0659; G06F 2212/7201
  See application file for complete search history.

(56) References Cited

U.S. PATENT DOCUMENTS

| | | | |
|---|---|---|---|
| 2012/0084484 A1* | 4/2012 | Post | G06F 3/061 710/308 |
| 2012/0198126 A1* | 8/2012 | Post | G06F 12/0246 711/103 |
| 2012/0221767 A1* | 8/2012 | Post | G06F 13/1673 711/103 |

FOREIGN PATENT DOCUMENTS

| | | |
|---|---|---|
| CN | 102722456 A | 10/2012 |
| CN | 104142894 A | 11/2014 |
| CN | 104182701 A | 12/2017 |

* cited by examiner

*Primary Examiner* — Edward J Dudek, Jr.
*Assistant Examiner* — Andrew Russell
(74) *Attorney, Agent, or Firm* — Kunzler Bean & Adamson

(57) ABSTRACT

A method, device and computer program product are disclosed. The method includes: receiving a command that reads data; parsing the command to obtain information sets; reading data based on the information sets; and sending the data and the information sets. The device includes: a memory that stores data in physical pages; and a controller that receives a command that reads data, parses the command to obtain information sets, reads data based on the information sets, and sends the data and the information sets. The computer program product includes code to: receive a command that reads data; parse the command to obtain information sets; read data based on the information sets; and send the data and the information sets.

20 Claims, 7 Drawing Sheets

US 10,642,494 B2

METHOD, ELECTRONIC DEVICE AND COMPUTER PROGRAM PRODUCT FOR DATA PROCESSING

FIELD

The present application relates to the field of data processing technologies, and more particularly to a method, electronic device and computer program product for data processing.

BACKGROUND

At present, SSDs (Solid State Drives) are becoming more popular in the consumer sector, and design of SSD controllers, especially those supporting NVMe (Non-Volatile Memory Express) protocol, have become popular.

Among current mainstream SSD controllers, 4K mapping technology is becoming more popular as well. Due to the characteristics of 4K mapping, data corresponding to a plurality of LBAs (Logical Block Addresses) may be stored on multiple physical pages.

When arranged in this way, addresses are dispersed as data written on the Nand Flash. In other words, the plurality of LBAs on one physical page are not continuous, so the same physical page may be read many times in response to different NVMe read commands when a SSD controller reads data, resulting in lower efficiency.

SUMMARY

A method, device and computer program product for data processing are disclosed.

The method includes: receiving a first command that reads data, the first command comprising one or more sets of first information and second information; parsing the first command to obtain the one or more sets of first information and second information; reading data corresponding to one or more LBA's (Logical Block Addresses) from a physical page based on the one or more sets of first information and second information; sending the data corresponding to the one or more LBAs; and sending the first information and second information.

The device includes: a memory that stores data in terms of physical pages; and a controller that receives a first command that reads data, the first command comprising one or more sets of first information and second information, parses the first command to obtain the one or more sets of first information and second information, reads data corresponding to one or more LBA's (Logical Block Addresses) from a physical page based on the one or more sets of first information and second information; sends the data corresponding to the one or more LBA's; and sends the first information and second information.

The computer program product includes code executable by a processor, the executable code comprising code to perform: receiving a first command that reads data, the first command comprising one or more sets of first information and second information; parsing the first command to obtain the one or more sets of first information and second information; reading data corresponding to one or more LBA's (Logical Block Addresses) from a physical page based on the one or more sets of first information and second information; sending the data corresponding to the one or more LBAs; and sending the first information and second information.

BRIEF DESCRIPTION OF THE DRAWINGS

To describe the disclosed technical solutions more clearly, accompanying drawings used for describing the embodiments are hereinafter briefly introduced. It is apparent that the accompanying drawings hereinafter are only intended to illustrate some embodiments of the present application.

DETAILED DESCRIPTION

To provide a thorough understanding of features and technical contents, some embodiments are explained in detail in conjunction with the drawings below, which are provided for reference only and are to be exemplary rather than limiting of the embodiments of the present disclosure.

Figure 1:
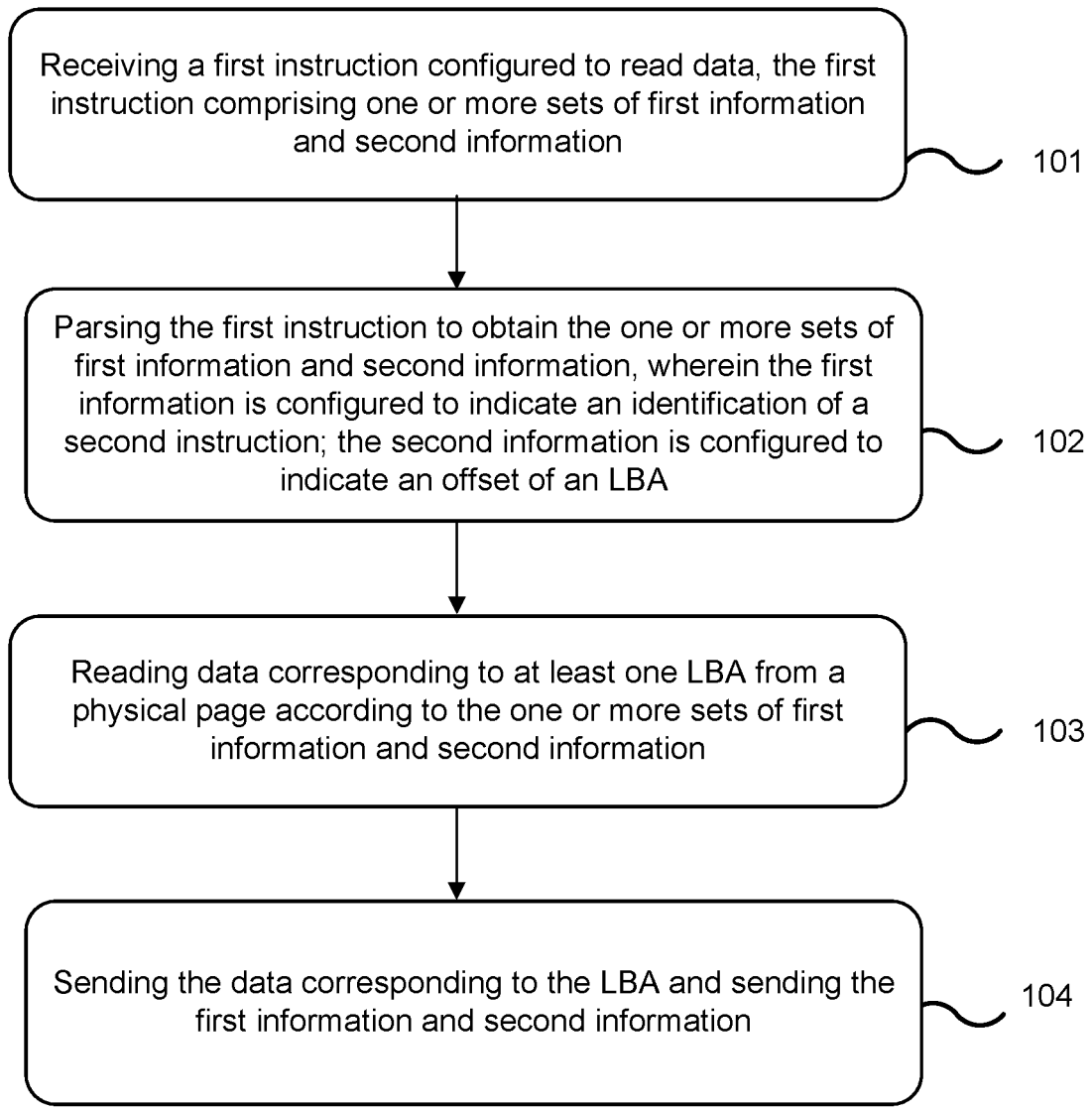
FIG. 1 is a schematic flow diagram of one embodiment of a data processing method.

FIG. 1 is a schematic flow diagram of one embodiment of a data processing method. The exemplary data processing method is applied to an electronic device. As shown in FIG. 1, this embodiment of the data processing method comprises Steps 101, 102, 103 and 104, which will now be described.

Step 101 comprises receiving a first command configured to read data, the first command comprising one or more sets of first information and second information.

In the embodiments, the electronic device may be a notebook, a host, an all-in-one machine, and the like. The electronic device has a processor, such as a CPU. The electronic device further has a solid-state drive, which comprises: a memory and a controller. The memory is configured to store data, and in some embodiments, comprises a Nand Flash. Generally, the Nand Flash stores data in terms of physical pages. The controller is configured to control read-in and write-out of data, and in some embodiments, comprises a Flash controller.

In the Flash controller, the size of a physical page of the Nand Flash is greater than that of mapping due to the characteristics of 4K mapping. Accordingly, data corresponding to a plurality of LBAs may be stored in every physical page. Due to randomness of data writing, the plurality of LBAs written on one physical page is not continuous. Currently, to read data, a plurality of Nand Flash commands is used to read data from the same physical page several times. For each NVMe command, data is returned. For example, when 4 stored LBAs are not located continuously in one 16K physical page, 4 Nand Flash commands are required to read data from the same physical page 4 times, resulting in low efficiency.

In one embodiment, a processor, such as a CPU, receives a second command, configured to read data sent from the host. The second command comprises an NVMe read command. The processor performs a unified schedule for LBAs requested by a plurality of second commands. Respective offsets of the LBAs requested by the second commands are determined according to specific values stored on the physical page in the Nand Flash. After that, using the identification corresponding to the second command as first information and using the offsets of the LBA corresponding to the second command as second information, the first and second information are written into the first command, which is a Nand Flash read command. As such, the first command comprises one or more sets of first information and second information. The processor sends the first command to the controller, such as a Flash controller, which executes the first command after receiving the first command. Accordingly, the first information and the second information corresponding to the one or more second commands are included in the first command.

Step 102 comprises parsing the first command to obtain the one or more sets of first information and second information, wherein the first information is configured to indicate an identification of a second command; the second information is configured to indicate an offset of an LBA.

In one embodiment, the controller parses the first command to obtain the one or more sets of first information and second information, wherein the first information indicates an identification of a second command, and the second information is configured to indicate an offset of an LBA.

Each set of first information and second information corresponds to a mapping block, and each mapping block corresponds to one LBA. As such, the first command indicates data corresponding to a plurality of LBAs.

Step 103 comprises reading data corresponding to at least one LBA from a physical page according to the one or more sets of first information and second information.

In one embodiment, wherein, as an example, the second command is the Nand Flash read command, and the first command is the NVMe read command, one Nand Flash read command acknowledges a plurality of NVMe read commands.

Each Nand Flash read command comprises one or more NVMe command identities ("Command IDs"), and corresponding offsets ("Block Offsets") of LBAs. Each set of a Command ID and an LBA offset of an NVMe command corresponds to one mapping block (Mapping Block). After each Nand Flash read command reads data from one physical page, the corresponding data is sent to a corresponding NVMe command in terms of the corresponding NVMe Command ID and the offset of LBA thereof.

Step 104 comprises sending the data corresponding to the LBA and sending the first information and second information.

In one embodiment, the controller in the electronic device sends the data corresponding to the LBA and the first information and the second information to the processor, and the processor calculates the address of the host according to the first information and the second information and sends the data to the host. Thus, one Nand Flash read command acknowledges a plurality of NVMe read commands, such that repetitive reading of one physical page is avoided and the issue of lower efficiency is eliminated. Accordingly, the efficiency of accessing Nand Flash is improved significantly.

Figure 2:
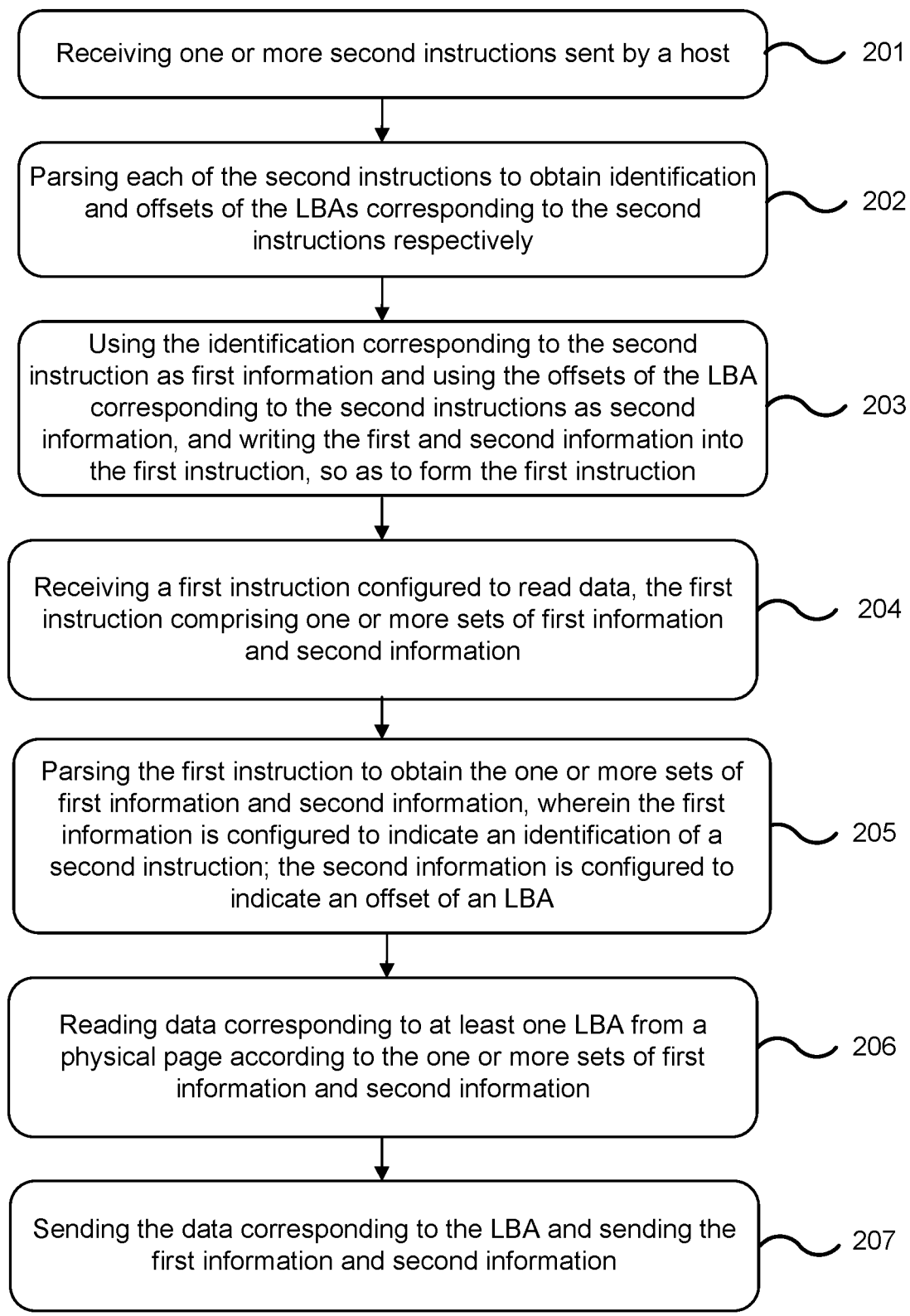
FIG. 2 is a schematic flow diagram of one embodiment of a data processing method.

FIG. 2 is a schematic flow diagram of one embodiment of a data processing method. The exemplary data processing method is applied to an electronic device. As shown in FIG. 2, one embodiment of the data processing method comprises Steps 201, 202, 203, 204, 205, 206 and 207, which will now be described.

Step 201 comprises receiving one or more second commands sent by a host.

In the embodiments, the electronic device may be a notebook, a host, an all-in-one machine, or other similar device. The electronic device has a processor, such as a CPU. The electronic device further has a solid-state drive, which comprises: a memory and a controller. The memory may comprise a Nand Flash, for example, and it is configured to store data. Generally, the Nand Flash stores data in terms of physical pages. The controller, which may be a Flash controller, for example, is configured to control read-in and write-out of data.

In the Flash controller, the size of a physical page of the Nand Flash is greater than that of mapping due to the characteristics of 4K mapping. Accordingly, data corresponding to a plurality of LBAs may be stored in every physical page. Due to the randomness of data writing, the plurality of LBAs written on one physical page is not continuous. Currently, to read data, a plurality of Nand Flash commands is used to read data from the same physical page several times. For each NVMe command, data is returned. For example, 4 stored LBAs are not located continuously in one 16K physical page, and, therefore, 4 Nand Flash commands are required to read data from the same physical page 4 times, resulting in low efficiency.

In one embodiment, a processor, such as a CPU, receives a second command, which is configured to read data sent from the host. The second command comprises an NVMe read command. The processor performs a unified schedule for LBAs requested by a plurality of second commands. Respective offsets of the LBAs requested by the second commands are determined according to specific values stored on the physical page in the Nand Flash.

Step 202 comprises parsing each of the second commands to obtain identification and offsets of the LBAs corresponding to the second commands.

Step 203 comprises using the identification corresponding to the second command as a first information, using the offsets of the LBA corresponding to the second command as a second information, and writing the first and second information into the first command, so as to form the first command.

The identification corresponding to the second command is used as a first information and the offset amounts of the LBA corresponding to the second command are used as a second information, and the first and second information are written into the first command, so as to form the first command, which comprises a Nand Flash read command. As such, the first command comprises one or more sets of first information and second information.

Step 204 comprises receiving a first command configured to read data, the first command comprising one or more sets of first information and second information.

In some embodiments, the processor sends the first command to the controller, a Flash controller, which executes the first command after receiving the first command. The first information and the second information corresponding to the one or more second commands are included in the first command.

Step 205 comprises parsing the first command to obtain the one or more sets of first information and second information, wherein the first information is configured to indicate an identification of a second command; the second information is configured to indicate an offset of an LBA.

In one embodiment, the controller parses the first command to obtain the one or more sets of first information and second information, wherein the first information is configured to indicate an identification of a second command; the second information is configured to indicate an offset of an LBA.

Each set of first information and second information corresponds to a mapping block, and each mapping block corresponds to one LBA. As such, the first command indicates data corresponding to a plurality of LBAs.

Step 206 comprises reading data corresponding to at least one LBA from a physical page according to the one or more sets of first information and second information.

In one exemplary embodiment, wherein the second command is the Nand Flash read command and the first command is the NVMe read command, one Nand Flash read command acknowledges a plurality of NVMe read commands.

Each Nand Flash read command comprises one or more NVMe command identities (Command IDs), and corresponding offsets (Block Offsets) of LBAs; wherein each set of a Command ID and an offset of LBA of an NVMe command corresponds to one mapping block (Mapping Block). After each Nand Flash read command reads data from one physical page, the corresponding data is sent to a corresponding NVMe command in terms of the corresponding NVMe Command ID and the LBA offset thereof.

Step 207 comprises sending the data corresponding to the LBA and sending the first information and second information.

In one embodiment, the controller in the electronic device sends the data corresponding to the LBA, the first information and the second information to the processor, after which the processor calculates the address of the host according to the first information and the second information and sends the data to the host. Thus, one Nand Flash read command acknowledges a plurality of NVMe read commands, such that repetitive reading of one physical page is avoided and the issue of lower efficiency is eliminated, significantly improving the efficiency of accessing Nand Flash.

Figure 3:
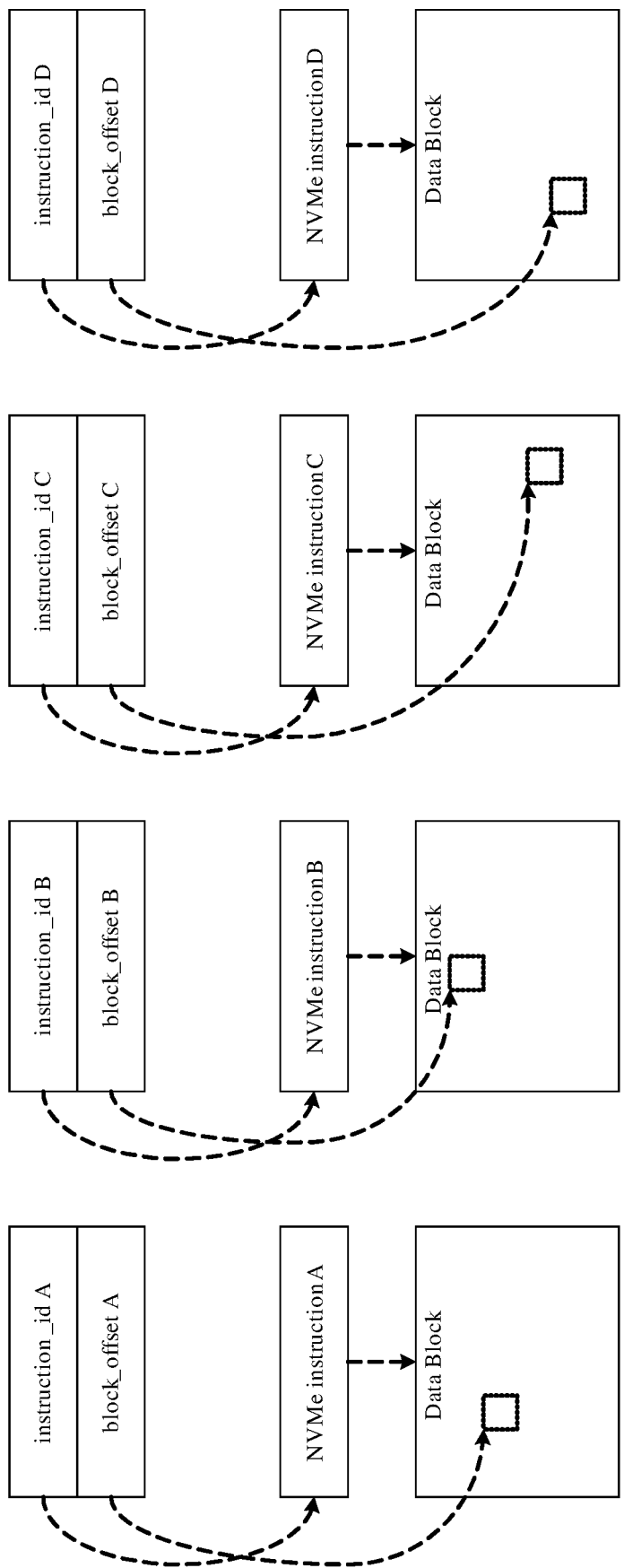
FIG. 3 is an information correspondence diagram of four sets of NVMe read commands in one embodiment.

FIG. 3 is an information correspondence diagram of four sets of NVMe read commands of one embodiment. In this embodiment, a plurality of sets of "Command ID (or Instruction ID) and Block Offset" pieces of information are stored in a Nand Flash read command. In an example that assumes the use of 4K mapping and a 16 KB physical page as an example, 4 sets of "NVMe Command ID and Block Offset" sets may be stored. The Command ID (also referred to as an Instruction ID) is an identification of an NVMe read command, which may determine a unique NVMe command, and the Block Offset is used to mark the offset of a corresponding data block from the data block corresponding to the NVMe read command. As shown in FIG. 3, the Command ID and Block Offset of NVMe Command A are command_id A and block_offset A, wherein command_id A uniquely determines command_id A and block_offset A uniquely determines a data block; NVMe Command B, NVMe Command C, NVMe Command D are structured similarly, each with their respective set of a command_id and a block_offset.

When an NVMe read command of the host is received, a CPU performs unified scheduling according to the LBA and the size of data block requested by the NVMe read command.

The CPU fills "Command ID (or Instruction Id) and Block Offset" information of each Nand Flash read command according to a specific value of LBA stored in a physical page in Nand Flash. A plurality of sets of "Command ID (or Instruction ID) and Block Offset" information may be filled for each Nand Flash read command.

The CPU then sends the Nand Flash read command with "Command ID and Block Offset" information that has been filled out to a Flash controller.

The Flash controller executes the Nand Flash read command to read the data in the physical page from the Nand Flash, and sends each mapping block and corresponding "Command ID and Block Offset" to the CPU.

The CPU calculates a corresponding host address in terms of "Command ID and Block Offset", and sends the data to the host.

When the current cached NVMe read command includes an LBA of one physical page, one Nand Flash command may be used to acknowledge a plurality of NVMe read commands. Hence, a corresponding LBA must be included in the current cached NVMe read command. To this end, a data processing method is provided in another embodiment, as shown in FIG. 4.

Figure 4:
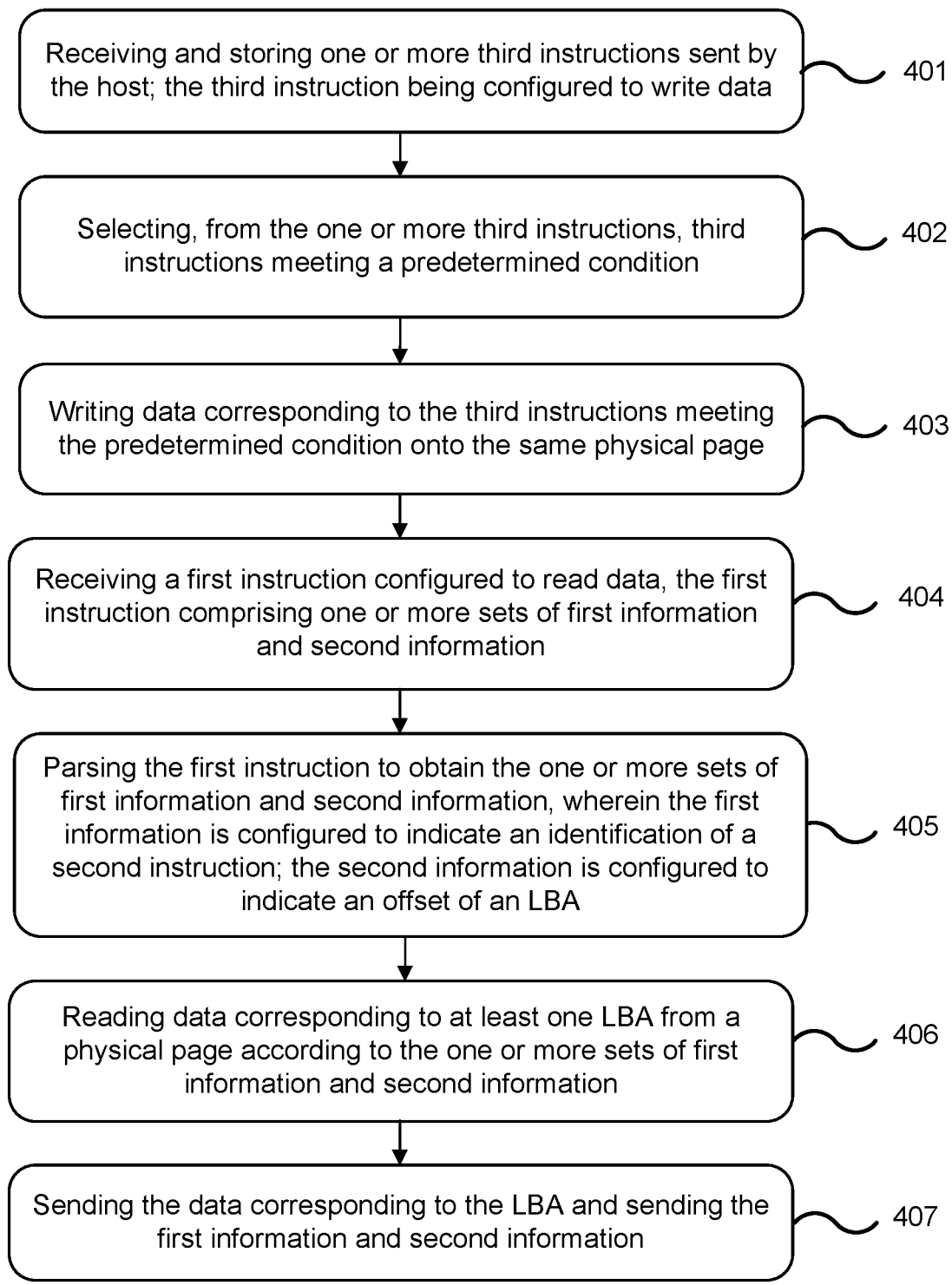
FIG. 4 is a schematic flow diagram of one embodiment of a data processing method.

FIG. 4 is a schematic flow diagram of one embodiment of a data processing method. As shown in FIG. 4, this embodiment of the data processing method comprises Steps 401, 402, 403, 404, 405, 406 and 407, which will now be described.

Step 401 comprises receiving and storing one or more third commands sent by the host, the third command being configured to write data.

In some embodiments, the electronic device may be a notebook, a host, an all-in-one machine, or other similar device. The electronic device comprises a processor, such as a CPU. The electronic device further comprises a solid-state drive, which itself comprises: a memory and a controller. The memory, such as a Nand Flash, is configured to store data. Generally, the Nand Flash stores data in terms of physical pages. The controller, such as a Flash controller, is configured to control read-in and write-out of data. In some embodiments, the third command is an NVMe write command. The CPU receives and caches the one or more third commands sent by the host.

Step 402 comprises electing, from the one or more third commands, third commands that meet a predetermined condition.

In one embodiment, the data to be written into the Nand Flash are categorized in terms of LBA. In this embodiment, distances between LBAs (i.e., differences between LBAs) on the same physical page for writing are intentionally limited to optimize later sequential reads without compromising random writing performance significantly.

Step 403 comprises writing data corresponding to the third commands meeting the predetermined condition onto the same physical page.

Step 404 comprises receiving a first command configured to read data, the first command comprising one or more sets of first information and second information.

In the Flash controller, the size of a physical page of the Nand Flash is greater than that of mapping due to characteristics of 4K mapping. Accordingly, data corresponding to a plurality of LBAs may be stored in a physical page. Due to the randomness of data writing, the plurality of LBAs written on one physical page are not continuous. Currently, to read data, a plurality of Nand Flash commands is used to read data from the same physical page several times. For each NVMe command, data is returned. For example, when 4 stored LBAs are not located continuously in one 16K physical page, 4 Nand Flash commands are required to read data from the same physical page 4 times, resulting in low efficiency.

In one embodiment, a processor, such as a CPU, receives a second command, which is configured to read data sent from the host. The second command comprises an NVMe read command. The processor performs a unified schedule for LBAs requested by a plurality of second commands. Respective offsets of the LBAs requested by the second commands are determined according to specific values stored on the physical page in the Nand Flash. The respective identities, which act as the first information and correspond to the second commands, and the offsets of the LBAs, which act as the second information and correspond to the second commands, are written into and form the first command, which is a Nand Flash read command. As such, the first command comprises one or more sets of first information and second information. The processor sends the first command to the controller, such as a Flash controller, which executes the first command after receiving the first command. Accordingly, the first information and the second information corresponding to the one or more second commands are included in the first command.

Step 405 comprises parsing the first command to obtain the one or more sets of first information and second information, wherein the first information is configured to indicate an identification of a second command and the second information is configured to indicate an offset of an LBA.

In one embodiment, the controller parses the first command to obtain the one or more sets of first information and second information, wherein the first information is configured to indicate an identification of a second command and the second information is configured to indicate an offset of an LBA.

Each set of first information and second information corresponds to a mapping block, and each mapping block corresponds to one LBA. As such, the first command indicates data corresponding to a plurality of LBAs.

Step 406 comprises reading data corresponding to at least one LBA from a physical page according to the one or more sets of first information and second information.

In one embodiment, assuming, as an example, that the second command is the Nand Flash read command and the first command is the NVMe read command, one Nand Flash read command acknowledges a plurality of NVMe read commands.

Each Nand Flash read command comprises one or more NVMe command identities (Command IDs or Instruction IDs), and corresponding offsets (Block Offsets) of LBAs; wherein each set of a Command ID and an LBA offset of an NVMe command corresponds to one mapping block (Mapping Block). After each Nand Flash read command reads data from one physical page, the corresponding data is sent to a corresponding NVMe command in terms of the corresponding NVMe Command ID and the offset of LBA thereof.

Step 407 comprises sending the data corresponding to the LBA and sending the first information and second information.

In one embodiment, the controller in the electronic device sends the data corresponding to the LBA, the first information and the second information to the processor, after which the processor calculates the address of the host according to the first information and the second information and sends the data to the host. Thus, one Nand Flash read command acknowledges a plurality of NVMe read commands, such that repetitive reading of one physical page is avoided and the efficiency of accessing Nand Flash is improved significantly.

Figure 5:
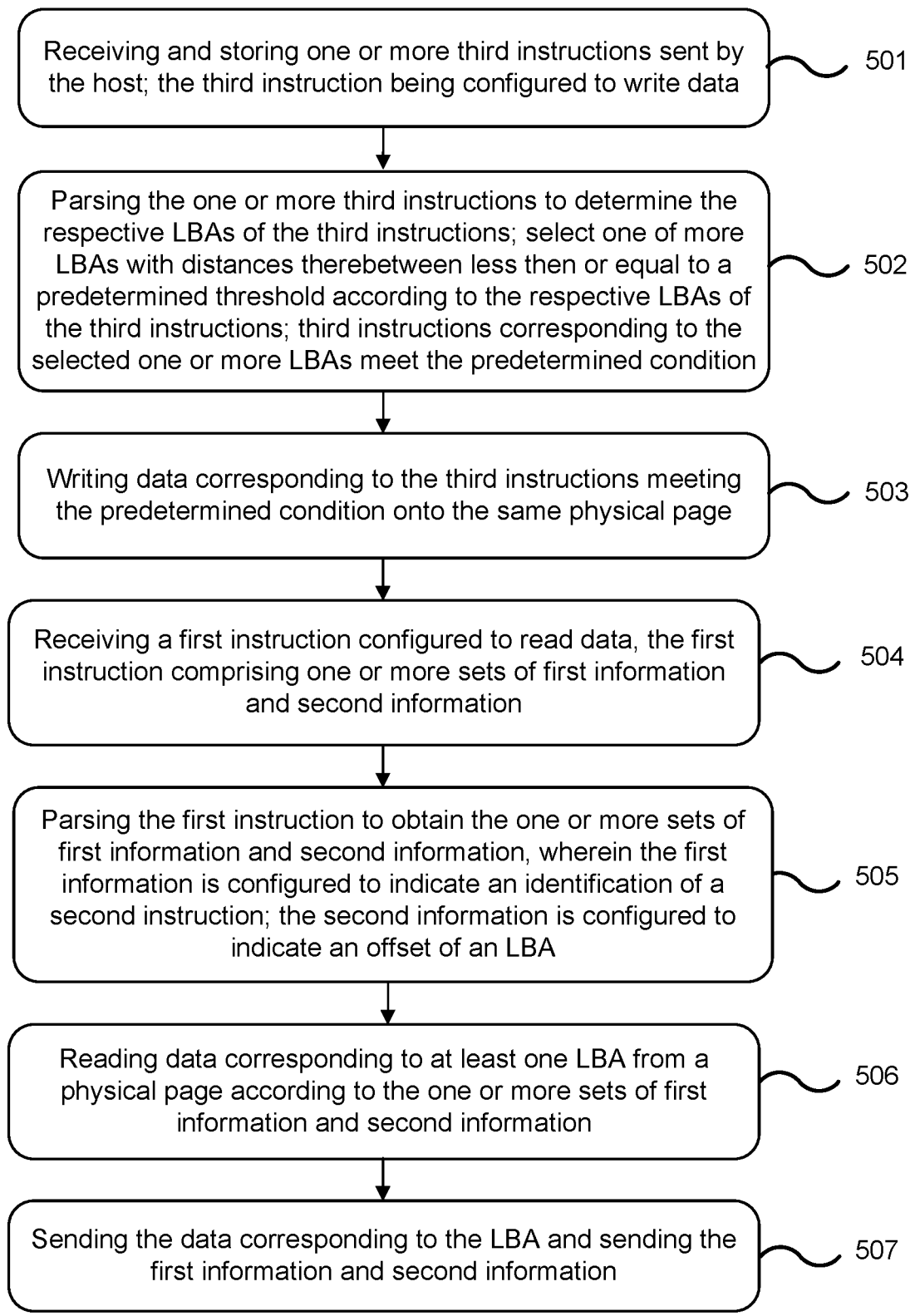
FIG. 5 is a schematic flow diagram of one embodiment of a data processing method.

FIG. 5 is a schematic flow diagram of one embodiment of a data processing method. As shown in FIG. 5, this embodiment of the data processing method comprises: Steps 501, 502, 503, 504, 505, 506, and 507, which will now be described.

Step 501 comprises receiving and storing one or more third commands sent by the host, the third command being configured to write data. In the various embodiments, the electronic device may be a notebook, a host, an all-in-one machine, or similar device. The electronic device comprises a processor, such as a CPU. The electronic device further comprises a solid-state drive, which itself comprises: a memory and a controller. The memory, such as a Nand Flash, is configured to store data. Generally, the Nand Flash stores data in terms of physical pages. The controller (for example, a Flash controller) is configured to control read-in and write-out of data.

In one embodiment, the third command is an NVMe write command. The CPU receives and caches the one or more third commands sent by the host.

Step 502 comprises parsing the one or more third commands to determine the respective LBAs of the third commands; selecting one or more LBAs with distances therebetween less than or equal to a predetermined threshold; and selecting third commands corresponding to the selected one or more LBAs that meet the predetermined condition.

In one embodiment, the data to be written into the Nand Flash are categorized in terms of LBA. Distances between LBAs (i.e., differences between LBAs) on the same physical page for writing are as intentionally limited to optimize later sequential reads without compromising random writing performance significantly.

Assuming that the size of the physical page is 16 KB, the size of mapping is 4 KB, and the size of LBA data block is 4 KB, 4 different LBA data blocks can be included on 1 physical page, while the minimum data unit for each access of Nand Flash is 4 KB.

When an NVMe write command of the host is reached, the CPU stores the reached NVMe write command in a buffer pool. The CPU then selects LBAs meeting a condition from the buffer pool of NVMe write commands to form and send a Nand Flash write command to the Flash controller. Assuming that there are 4 LBA data blocks, which are set as LBA0, LBA1, LBA2, LBA3, on each physical page, the condition comprises the following: $|LBA_i-LBA_j|\leq 128K$ if the solution of "one Nand Flash read command acknowledging a plurality of NVMe read commands" is not used; $|LBA_i-LBA_j|\leq 512$ KB if the solution of "one Nand Flash read command acknowledging a plurality of NVMe read commands" is used; where i, j=0, 1, 2, 3.

Step 503 comprises writing data corresponding to the third commands that meet the predetermined condition onto the same physical page.

Step 504 comprises receiving a first command configured to read data, the first command comprising one or more sets of first information and second information.

In the Flash controller, the size of a physical page of the Nand Flash is greater than that of mapping due to characteristics of 4K mapping. Accordingly, data corresponding to a plurality of LBAs may be stored in a physical page. Due to the randomness of data writing, the plurality of LBAs written on one physical page are not continuous. Currently, to read data, a plurality of Nand Flash commands is used to read data from the same physical page several times. For each NVMe command, data is returned. For example, when 4 stored LBAs are not located continuously in one 16K physical page, 4 Nand Flash commands are required to read data from the same physical page 4 times, resulting in low efficiency.

In one embodiment, a processor, such as a CPU, receives a second command, which is configured to read data sent from the host. The second command comprises an NVMe read command. The processor performs a unified schedule for LBAs requested by a plurality of second commands. Respective offsets of the LBAs requested by the second commands are determined according to specific values stored on the physical page in the Nand Flash. The respective identities, which act as the first information and correspond to the second commands, and the offsets of the LBAs, which act as the second information and correspond to the second commands, are written into and form the first command, which is a Nand Flash read command. As such, the first command comprises one or more sets of first information and second information. The processor sends the first command to the controller (which, as an example, may comprise a Flash controller), which executes the first command after receiving the first command. Accordingly, the first information and the second information corresponding to the one or more second commands are included in the first command.

Step 505 comprises parsing the first command to obtain the one or more sets of first information and second information, wherein the first information is configured to indicate an identification of a second command and the second information is configured to indicate an offset of an LBA.

In one embodiment, the controller parses the first command to obtain the one or more sets of first information and second information, wherein the first information is configured to indicate an identification of a second command and the second information is configured to indicate an offset of an LBA.

Herein, each set of first information and second information corresponds to a mapping block, and each mapping block corresponds to one LBA. As such, the first command indicates data corresponding to a plurality of LBAs.

Step 506 comprises reading data corresponding to at least one LBA from a physical page according to the one or more sets of first information and second information.

In one embodiment, assuming that, as an example, the second command comprises the Nand Flash read command and the first command comprises the NVMe read command, one Nand Flash read command acknowledges a plurality of NVMe read commands.

Each Nand Flash read command comprises one or more NVMe command identities (Command IDs or Instruction IDs), and corresponding offsets (Block Offsets) of LBAs. Each set of a Command ID (or Instruction IDs) and an LBA offset of an NVMe command corresponds to one mapping block (Mapping Block). After each Nand Flash read command reads data from one physical page, the corresponding data is sent to a corresponding NVMe command in terms of the corresponding NVMe Command ID (or Instruction ID) and the offset of LBA thereof.

Step 507 comprises sending the data corresponding to the LBA and sending the first information and second information.

In one embodiment, the controller in the electronic device sends the data corresponding to the LBA, the first information and the second information to the processor, after which the processor calculates the address of the host according to the first information and the second information and sends the data to the host. Thus, one Nand Flash read command acknowledges a plurality of NVMe read commands, such that repetitive reading of one physical page is avoided and the efficiency of accessing Nand Flash is improved significantly.

Figure 6:
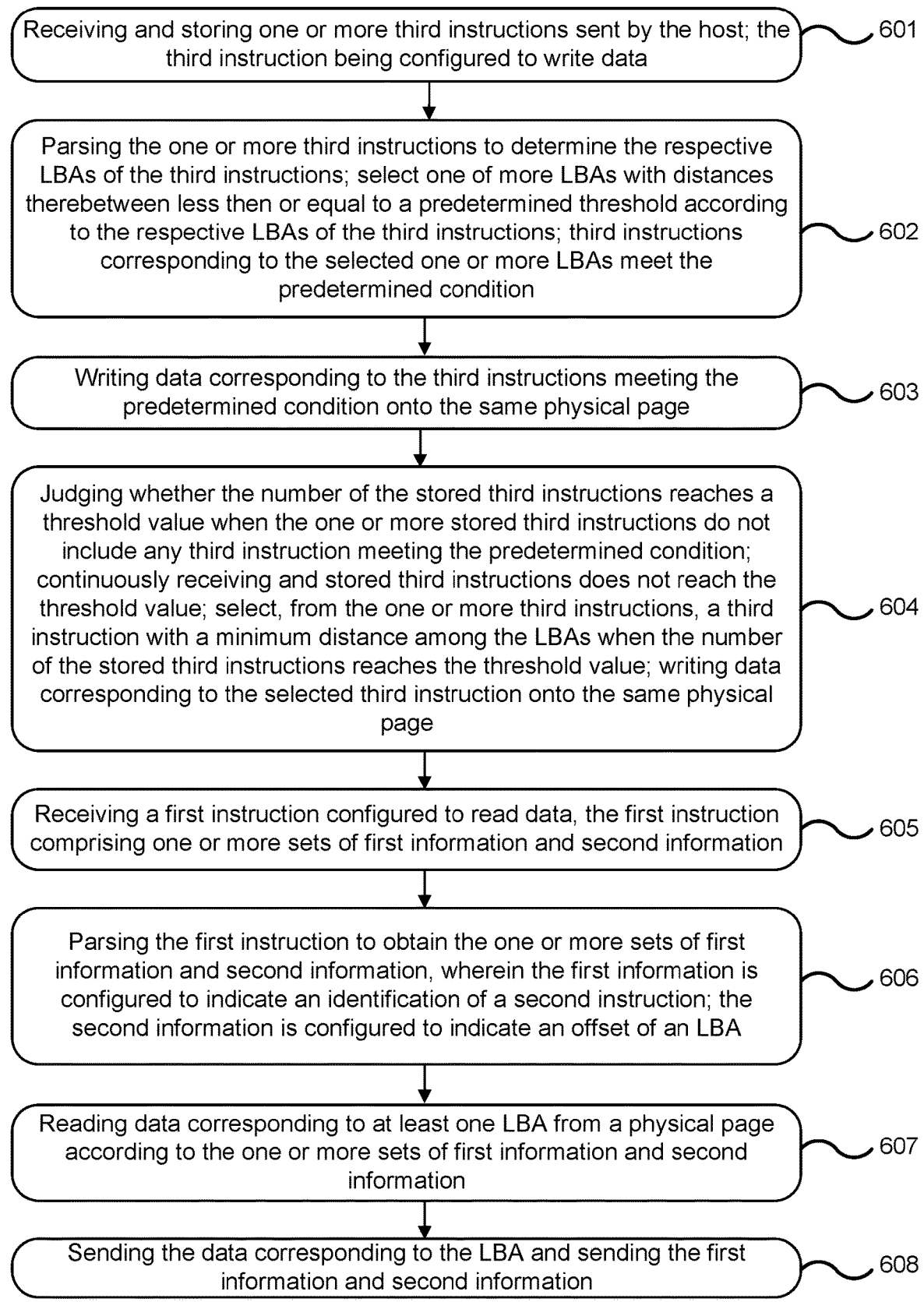
FIG. 6 is a schematic flow diagram of one embodiment of a data processing method.

FIG. 6 is a schematic flow diagram of one embodiment of a data processing method. As shown in FIG. 6, one embodiment of the data processing method comprises Step 601, Step 602, Step 603, Step 604, Step 605, Step 606, Step 607, and Step 608, all of which will now be described.

Step 601 comprises receiving and storing one or more third commands sent by the host, the third command being configured to write data.

In one embodiment, the electronic device may be a notebook, a host, an all-in-one machine, or other similar device. The electronic device comprises a processor, such as a CPU. The electronic device further comprises a solid-state drive, which itself comprises: a memory and a controller. The memory, which may comprise, as an example, a Nand Flash, is configured to store data. Generally, the Nand Flash stores data in terms of physical pages. The controller is configured to control read-in and write-out of data, and may comprises, as an example, a Flash controller.

In one embodiment, the third command comprises an NVMe write command, and the CPU receives and caches the one or more third commands sent by the host.

Step 602 comprises: parsing the one or more third commands to determine the respective LBAs of the third commands; selecting one or more LBAs with distances therebetween less than or equal to a predetermined threshold according to the respective LBAs of the third commands; and selecting the third commands corresponding to the selected one or more LBAs that meet the predetermined condition.

In one embodiment, the data to be written into the Nand Flash are categorized in terms of LBA. Distances between LBAs (i.e., differences between LBAs) on the same physical page for writing are as intentionally limited to optimize later sequential reads without compromising random writing performance significantly.

Assuming that the size of the physical page is 16 KB, the size of mapping is 4 KB, and the size of LBA data block is 4 KB, 4 different LBA data blocks can be included on 1 physical page, while the minimum data unit for each access of Nand Flash is 4 KB.

When an NVMe write command of the host is reached, the CPU stores the reached NVMe write command in a buffer pool. The CPU then selects LBAs meeting a condition from the buffer pool of NVMe write commands to form and send a Nand Flash write command to the Flash controller. Assuming that there are 4 LBA data blocks, which are set as LBA0, LBA1, LBA2, LBA3, on each physical page, the condition comprises the following: $|LBA_i-LBA_j|\leq 128K$ if the solution of "one Nand Flash read command acknowledging a plurality of NVMe read commands" is not used; $|LBA_i-LBA_j|\leq 512$ KB if the solution of "one Nand Flash read command acknowledging a plurality of NVMe read commands" is used; where i, j=0, 1, 2, 3.

Step 603 comprises writing data corresponding to the third commands that meet the predetermined condition onto the same physical page.

Step 604 comprises: judging whether the number of the stored third commands reaches a threshold value in a state wherein the one or more stored third commands do not include any third command meeting the predetermined condition; continuously receiving and storing the third commands sent by the host when the number of the stored third commands does not reach the threshold value; selecting, from the one or more third commands, a third command with a minimum distance among the LBAs when the number of the stored third commands reaches the threshold value;

and writing data corresponding to the selected third command onto the same physical page.

In one embodiment, if no LBA meeting the predetermined condition is selected, but the NVMe write command buffer pool is not full, then, temporarily, there is no further processing done until a new NVMe command is reached for continuing execution of step 602.

If no LBA meeting the predetermined condition is selected, and the NVMe write command buffer pool is full, then a set of LBAs with relatively small distances are selected to form a Nand Flash write command to be sent to the Flash controller. After that, processing waits until receipt of a new NVMe write command.

Step 605 comprises receiving a first command configured to read data, the first command comprising one or more sets of first information and second information.

In the Flash controller, the size of a physical page of the Nand Flash is greater than that of mapping due to characteristics of 4K mapping. Accordingly, data corresponding to a plurality of LBAs may be stored in a physical page. Due to the randomness of data writing, the plurality of LBAs written on one physical page are not continuous. Currently, to read data, a plurality of Nand Flash commands is used to read data from the same physical page several times. For each NVMe command, data is returned. For example, when 4 stored LBAs are not located continuously in one 16K physical page, 4 Nand Flash commands are required to read data from the same physical page 4 times, resulting in low efficiency.

In one embodiment, a processor, such as a CPU, receives a second command, which is configured to read data sent from the host. The second command comprises an NVMe read command. The processor performs a unified schedule for LBAs requested by a plurality of second commands. Respective offsets of the LBAs requested by the second commands are determined according to specific values stored on the physical page in the Nand Flash. The respective identities, which act as the first information and correspond to the second commands, and the offsets of the LBAs, which act as the second information and correspond to the second commands, are written into and form the first command, which is a Nand Flash read command. As such, the first command comprises one or more sets of first information and second information. The processor sends the first command to the controller (which, as an example, may comprise a Flash controller), which executes the first command after receiving the first command. Accordingly, the first information and the second information corresponding to the one or more second commands are included in the first command.

Step 606 comprises parsing the first command to obtain the one or more sets of first information and second information, wherein the first information is configured to indicate an identification of a second command and the second information is configured to indicate an LBA offset.

In one embodiment, the controller parses the first command to obtain the one or more sets of first information and second information, wherein the first information is configured to indicate an identification of a second command and the second information is configured to indicate an offset of an LBA.

Herein, each set of first information and second information corresponds to a mapping block, and each mapping block corresponds to one LBA. As such, the first command indicates data corresponding to a plurality of LBAs.

Step 607 comprises reading data corresponding to at least one LBA from a physical page according to the one or more sets of first information and second information.

In one embodiment, assuming that, as an example, the second command comprises the Nand Flash read command and the first command comprises the NVMe read command, one Nand Flash read command acknowledges a plurality of NVMe read commands.

Each Nand Flash read command comprises one or more NVMe command identities (Command IDs or Instruction IDs), and corresponding offsets (Block Offsets) of LBAs. Each set of a Command ID (or Instruction IDs) and an LBA offset of an NVMe command corresponds to one mapping block (Mapping Block). After each Nand Flash read command reads data from one physical page, the corresponding data is sent to a corresponding NVMe command in terms of the corresponding NVMe Command ID (or Instruction ID) and the offset of LBA thereof.

Step 608 comprises sending the data corresponding to the LBA and sending the first information and second information.

In one embodiment, the controller in the electronic device sends the data corresponding to the LBA, the first information and the second information, to the processor, after which the processor calculates the address of the host according to the first information and the second information and sends the data to the host. Thus, one Nand Flash read command acknowledges a plurality of NVMe read commands, such that repetitive reading of one physical page is avoided and the efficiency of accessing Nand Flash is improved significantly.

Figure 7:
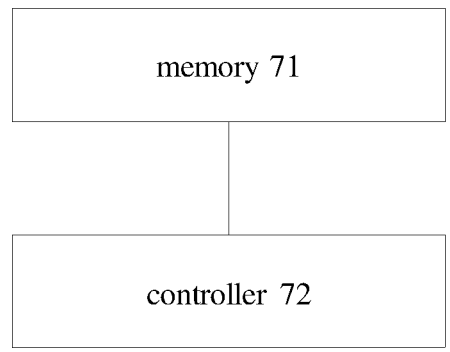
FIG. 7 is a schematic structural composition diagram of one embodiment of an electronic device.

FIG. 7 is a schematic structural composition diagram of one embodiment of an electronic device.

The electronic device comprises: a memory 71, configured to store data in terms of physical pages. The electronic device further comprises a controller 72, configured to: receive a first command used to read data, the first command comprising one or more sets of first information and second information; parse the first command to obtain the one or more sets of first information and second information, wherein the first information is configured to indicate an identification of a second command and the second information is configured to indicate an offset of an LBA; read data corresponding to at least one LBA from a physical page according to the one or more sets of first information and second information; and send the data corresponding to the LBA and send the first information and second information.

It should be understood by persons of skill in the art that reference can be made to the descriptions related to the data processing method mentioned above regarding the function implementation of various units in the electronic device shown in FIG. 7.

Figure 8:
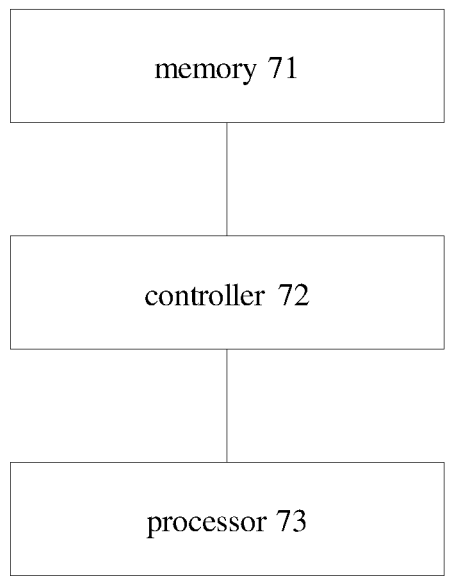
FIG. 8 is a schematic structural composition diagram of one embodiment of an electronic device.

FIG. 8 is a schematic structural composition diagram of one embodiment of an electronic device.

The electronic device comprises a memory 71, configured to store data in terms of physical pages. The electronic device further comprises a controller 72, configured to: receive a first command used to read data, the first command comprising one or more sets of first information and second information; parse the first command to obtain the one or more sets of first information and second information, wherein the first information is configured to indicate an identification of a second command and the second information is configured to indicate an offset of an LBA; read data corresponding to at least one LBA from a physical page according to the one or more sets of first information and second information; and send the data corresponding to the LBA and send the first information and second information.

The electronic device further comprises a processor 73, configured to: receive one or more second commands sent by a host; parse each of the second commands to obtain respective identification and LBA offsets corresponding to each of the second commands; use the identification corresponding to the second command as a first information and use the offsets of the LBA corresponding to the second command as second information; and write the first and second information into the first command, so as to form the first command.

It should be understood by persons of skill in the art that reference can be made to the descriptions related to the data processing method mentioned above regarding function implementation of various units in the electronic device shown in FIG. 8.

In another embodiment, the electronic device comprises a memory 71, configured to store data in terms of physical pages. The electronic device further comprises a controller 72, configured to: receive a first command used to read data, the first command comprising one or more sets of first information and second information; parse the first command to obtain the one or more sets of first information and second information, wherein the first information is configured to indicate an identification of a second command and the second information is configured to indicate an LBA offset; read data corresponding to at least one LBA from a physical page according to the one or more sets of first information and second information; and send the data corresponding to the LBA and send the first information and second information.

The electronic device further comprises a processor 73, configured to: receive one or more second commands sent by a host; parse each of the second commands to obtain respective identification and offsets of the LBAs corresponding to each of the second commands; use the identification corresponding to the second command as first information and using the offsets of the LBA corresponding to the second command as second information and writing the first and second information into the first command, so as to form the first command.

The processor 73 is further configured to: receive and store one or more third commands sent by the host, the third command being configured to write data; and select, from the one or more third commands, third commands meeting a predetermined condition.

The controller 72 is further configured to write data corresponding to the third commands meeting the predetermined condition, onto the same physical page.

In yet another embodiment, the electronic device comprises: a memory 71, configured to store data in terms of physical pages.

This electronic device further comprises a controller 72, configured to: receive a first command used to read data, the first command comprising one or more sets of first information and second information; parse the first command to obtain the one or more sets of first information and second information, wherein the first information is configured to indicate an identification of a second command and the second information is configured to indicate an offset of an LBA; read data corresponding to at least one LBA from a physical page according to the one or more sets of first information and second information; and send the data corresponding to the LBA and send the first information and second information.

The electronic device further comprises a processor 73, configured to: receive one or more second commands sent by a host; parse each of the second commands to obtain respective identification and offsets of the LBAs corresponding to each of the second commands; use the identification corresponding to the second command as first information and use the offsets of the LBA corresponding to the second command as second information; and write the first and second information into the first command, so as to form the first command.

The processor 73 is further configured to: receive and store one or more third commands sent by the host, the third command being configured to write data; and select, from the one or more third commands, third commands meeting a predetermined condition.

The controller 72 is further configured to write data, corresponding to the third commands meeting the predetermined condition onto the same physical page.

The processor 73 is further configured to: parse the one or more third commands to determine the respective LBAs of the third commands; select one or more LBAs with distances therebetween less than or equal to a predetermined threshold according to the respective LBAs of the third commands; and select the third commands corresponding to the selected one or more LBAs meet the predetermined condition.

In another embodiment, the electronic device comprises: a memory 71, configured to store data in terms of physical pages.

This electronic device further comprises: a controller 72, configured to: receive a first command used to read data, the first command comprising one or more sets of first information and second information; parse the first command to obtain the one or more sets of first information and second information, wherein the first information is configured to indicate an identification of a second command and the second information is configured to indicate an LBA offset; read data corresponding to at least one LBA from a physical page according to the one or more sets of first information and second information; send the data corresponding to the LBA; and send the first information and second information.

The electronic device further comprises a processor 73, configured to: receive one or more second commands sent by a host; parse each of the second commands to obtain respective identification and offsets of the LBAs corresponding to each of the second commands; use the identification corresponding to the second command as first information and using the offsets of the LBA corresponding to the second command as second information; and write the first and second information into the first command, so as to form the first command.

The processor 73 is further configured to receive and store one or more third commands sent by the host, the third command(s) being configured to write data; and select, from the one or more third commands, third commands meeting a predetermined condition.

The controller 72 is further configured to write data, corresponding to the third commands meeting the predetermined condition, onto the same physical page.

The processor 73 is further configured to: determine whether the number of the stored third commands reaches a threshold value in state wherein none of the one or more stored third commands meet the predetermined condition; continuously receive and store the third commands sent by the host when the number of the stored third commands does not reach the threshold value; and select, from the one or more third commands, a third command with a minimum distance among the LBAs after the number of the stored third commands reaches the threshold value.

The controller 72 is further configured to write data corresponding to the selected third command onto the same physical page.

Different technical solutions recorded in the various embodiments may be combined arbitrarily without conflict therebetween.

In the several embodiments provided, it should be understood that the disclosed method and electronic device may be implemented in other manners. The above described device embodiments are merely illustrative. For example, the unit division is merely one logical function division and may be in other division manners in actual practice. For example, a plurality of units or components may be combined or integrated into another system, or some features can be omitted or disabled. Additionally, coupling, direct coupling, or communication connections among the parts as shown or discussed may be implemented through an interface or interfaces, and indirect coupling or communication connections of devices or units may be electrical, mechanical, or in other forms.

The units used as separate components may or may not be physically independent of each other. The element illustrated as a unit may or may not be a physical unit. For example, the illustrated element may be located at one position or deployed among a plurality of network units. A part or all of the units may be selected according to the actual needs to achieve the objectives of the solutions of the embodiments.

In addition, the functional units in the various embodiments may be integrated in one second processing unit, or may separately and physically exist as a single unit, or two or more units may be integrated into one unit. The integrated unit may be implemented by means of hardware, or may also be implemented in a form of hardware plus software functional unit.

The above embodiments are used only for illustration, and are not intended to limit the scope of the present disclosure. Various modifications and replacements readily derived by persons of skill in the art shall fall within the scope of the present disclosure.

What is claimed is:

1. A method, comprising:
receiving from a host, by a processor, a first read command that reads data, the first read command comprising one or more sets of first information and second information;
parsing the first read command to obtain the one or more sets of first information and second information;
reading data corresponding to one or more Logical Block Addresses (LBAs) from a physical page based on the one or more sets of first information and second information;
receiving, from the host, one or more write commands for writing data;
storing the one or more write commands as one or more stored write commands;
determining whether a quantity of the stored write commands reaches a threshold value while the stored write commands do not include any stored write commands meeting a predetermined condition; and
writing data corresponding to a stored write command with a minimum distance onto a same physical page as data corresponding to one or more stored write commands meeting the predetermined condition,
wherein:
the first read command includes a first format,
the first information comprises an identification of a second read command including a second format, and
the second read command acknowledges a plurality of first read commands.

2. The method of claim 1, wherein:
the first format includes a Non-Volatile Memory Express (NVMe) read format;
the second format includes a Flash read format; and
the second information comprises an offset of an LBA.

3. The method of claim 2, further comprising:
receiving one or more additional first read commands including the first read format sent by the host, wherein each first read command comprises a respective second read command including the second read format and acknowledging said two or more first read commands;
parsing each of the second read commands to obtain identification and LBA offsets corresponding to each of the second read commands;
using the identification corresponding to each second read command as first information;
using the LBA offsets corresponding to each second read command as second information; and
writing each first and second information into each first read command.

4. The method of claim 1, further comprising:
selecting, from the one or more stored write commands, stored write commands meeting the predetermined condition; and
writing the data corresponding to the stored write commands meeting the predetermined condition onto the same physical page as the data corresponding to the stored write command with the minimum distance.

5. The method of claim 4, wherein selecting, from the one or more stored write commands, stored write commands meeting the predetermined condition comprises:
parsing the one or more stored write commands to determine respective LBAs of the stored write commands;
selecting one or more LBAs with distances therebetween no greater than a predetermined threshold based on the respective LBAs of the stored write commands; and
selecting stored write commands corresponding to the selected one or more LBAs.

6. The method of claim 4, further comprising:
continuously receiving and storing the write commands sent by the host until the quantity of stored write commands reaches the threshold value.

7. The method of claim 6, further comprising:
selecting, from the stored write commands, the stored write command with the minimum distance,
wherein the selected stored write command is included among the LBAs after the number of the stored write commands reaches the threshold value.

8. An electronic device, comprising:
a memory that stores data in terms of physical pages; and
a controller configured to:
receive, from a host, a first read command that reads data, the first read command comprising one or more sets of first information and second information;
parse the first read command to obtain the one or more sets of first information and second information;
read data corresponding to one or more Logical Block Addresses (LBAs) from a physical page based on the one or more sets of first information and second information;
send the data corresponding to the one or more LBAs;

send the first information and second information;
receive, from the host, one or more write commands for writing data;
store the one or more write commands as one or more stored write commands;
determining whether a quantity of the stored write commands reaches a threshold value while the stored write commands do not include any stored write commands meeting a predetermined condition; and
writing data corresponding to a stored write command with a minimum distance onto a same physical page as data corresponding to one or more stored write commands meeting the predetermined condition,
wherein:
the first read command includes a first format,
the first information comprises an identification of a second read command including a second format, and
the second read command acknowledges a plurality of first read commands.

9. The electronic device of claim 8, wherein:
the first format includes a Non-Volatile Memory Express (NVMe) read format;
the second format includes a Flash read format; and
the second information comprises an offset of an LBA.

10. The electronic device of claim 9, wherein the controller is further configured to:
receive one or more additional first read commands including the first read format sent by the host, wherein each first read command comprises a respective second read command including the second read format and acknowledging said two or more first read commands;
parse each of the second read commands to obtain identification and LBA offsets corresponding to each of the second read commands;
utilize the identification corresponding to each second read command as first information;
utilize the LBA offsets corresponding to each second read command as second information; and
write the first and second information into the first command.

11. The electronic device of claim 8, wherein the controller is further configured to:
select, from the one or more stored write commands, stored write commands meeting the predetermined condition; and
write data corresponding to the stored write commands meeting the predetermined condition onto the same physical page as the data corresponding to the stored write command with the minimum distance.

12. The electronic device of claim 11, wherein the processor is further configured to:
parse the one or more stored write commands to determine respective LBAs of the stored write commands;
select one or more LBAs with distances therebetween no greater than a predetermined threshold according to the respective LBAs of the stored write commands; and
select stored write commands corresponding to the selected one or more LBAs.

13. The electronic device of claim 11, wherein the controller is further configured to:
continuously receive and store the write commands sent by the host until the quantity of the stored write commands reaches the threshold value.

14. The electronic device of claim 11, wherein the controller is further configured to:
select, from the one or more stored write commands, the stored write command with the minimum distance,
wherein the selected stored write command is included among the LBAs after the number of the stored write commands reaches the threshold value.

15. A computer program product comprising a computer readable storage medium that stores code executable by a processor, the executable code comprising code to perform:
receiving, from a host, a first read command that reads data, the first read command comprising one or more sets of first information and second information;
parsing the first read command to obtain the one or more sets of first information and second information;
reading data corresponding to one or more Logical Block Addresses (LBAs) from a physical page based on the one or more sets of first information and second information;
sending the data corresponding to the one or more LBAs;
sending the first information and second information;
receiving, from the host, one or more write commands for writing data;
storing the one or more write commands as one or more stored write commands;
determining whether a quantity of the stored write commands reaches a threshold value while the stored write commands do not include any stored write commands meeting a predetermined condition; and
writing data corresponding to a stored write command with a minimum distance onto a same physical page as data corresponding to one or more stored write commands meeting the predetermined condition,
wherein:
the first read command includes a first format,
the first information comprises an identification of a second read command including a second format, and
the second read command acknowledges a plurality of first read commands.

16. The computer program product of claim 15, wherein:
the first format includes a Non-Volatile Memory Express (NVMe) read format;
the second format includes a Flash read format; and
the second information comprises an offset of an LBA.

17. The computer program product of claim 16, further comprising code to perform:
receiving one or more additional first read commands including the first read format sent by the host, wherein each first read command comprises a respective second read command including the second read format and acknowledging said two or more first read commands;
parsing each of the second read commands to obtain identification and LBA offsets corresponding to each of the second read commands;
using the identification corresponding to each second read command as first information;
using LBA offsets corresponding to each second read command as second information; and
writing the first and second information into each first command.

18. The computer program product of claim 15, further comprising code to perform:
selecting, from the one or more stored write commands, stored write commands meeting the predetermined condition; and
writing data corresponding to the stored write commands meeting the predetermined condition onto the same physical page as the data corresponding to the stored write command with the minimum distance.

19. The computer program product of claim 18, wherein selecting, from the one or more stored write commands, stored write commands meeting a predetermined condition comprises:
- parsing the one or more stored write commands to determine respective LBAs of the stored write commands selecting one or more LBAs with distances therebetween no greater than a predetermined threshold according to the respective LBAs of the stored write commands; and
- selecting stored write commands corresponding to the selected one or more LBAs.

20. The computer program product of claim 18, further comprising code to perform:
- continuously receiving and storing the write commands sent by the host until the number of the stored write commands reaches the threshold value; and
- selecting, from the one or more stored write commands, the stored write command with the minimum distance,
- wherein the selected stored write command is included among the LBAs after the number of the stored write commands reaches the threshold value.

* * * * *